US007825889B2

(12) United States Patent
Kim et al.

(10) Patent No.: US 7,825,889 B2
(45) Date of Patent: Nov. 2, 2010

(54) FIELD SEQUENTIAL MODE LIQUID CRYSTAL DISPLAY DEVICE AND METHOD OF DRIVING THE SAME

(75) Inventors: Gi-Hong Kim, Gyeonggido (KR); Jong-Hoon Woo, Gyeonggido (KR)

(73) Assignee: LG. Display Co., Ltd., Seoul (KR)

(*) Notice: Subject to any disclaimer, the term of this patent is extended or adjusted under 35 U.S.C. 154(b) by 1350 days.

(21) Appl. No.: 11/107,769

(22) Filed: Apr. 15, 2005

(65) Prior Publication Data

US 2005/0231496 A1 Oct. 20, 2005

(30) Foreign Application Priority Data

Apr. 16, 2004 (KR) ...................... 10-2004-0026337

(51) Int. Cl.
*G09G 3/36* (2006.01)
*G02F 1/133* (2006.01)

(52) U.S. Cl. ............................ 345/101; 345/87; 349/72

(58) Field of Classification Search ................... 345/87, 345/101; 349/56, 72

See application file for complete search history.

(56) References Cited

U.S. PATENT DOCUMENTS

| | | | | |
|---|---|---|---|---|
| 5,597,223 | A * | 1/1997 | Watanabe et al. | 353/97 |
| 6,184,631 | B1 * | 2/2001 | Noma et al. | 315/224 |
| 6,392,626 | B1 * | 5/2002 | Moon | 345/94 |
| 6,930,667 | B1 * | 8/2005 | Iijima et al. | 345/101 |
| 2003/0107546 | A1 * | 6/2003 | Ham | 345/101 |

OTHER PUBLICATIONS

A. Takimoto, K. Nakao and H. Wakemoto, "*Recent Progress of LCD-TVs Using OCB Mode*" pp. 299-302, IDW 2004.

* cited by examiner

*Primary Examiner*—Srilakshmi K Kumar
(74) *Attorney, Agent, or Firm*—Brinks Hofer Gilson & Lione

(57) ABSTRACT

A temperature-compensating circuit for a liquid crystal display device includes a temperature-sensing unit that measures the temperature of the liquid crystal display device and the surrounding ambient temperature. The temperature-sensing unit outputs a gate voltage-converting signal using the measured temperature. A DC/DC converting unit generates a plurality of converted gate signals using the gate voltage-converting signal. Absolute values of the plurality of converted gate signals are different from each other.

19 Claims, 8 Drawing Sheets

FIELD SEQUENTIAL MODE LIQUID CRYSTAL DISPLAY DEVICE AND METHOD OF DRIVING THE SAME

PRIORITY CLAIM

The present invention claims the benefit of Korean Patent Application No. 2004-0026337, filed in Korea on Apr. 16, 2004, which is hereby incorporated by reference.

FIELD OF THE INVENTION

The present invention relates to a liquid crystal display device, and more particularly, to a field sequential liquid crystal display device having a temperature compensation circuit and a driving method thereof.

DISCUSSION OF THE RELATED ART

Cathode ray tubes (CRTs) have been widely used for display devices such as a television and a monitor. However, the CRTs have some disadvantages, for example, heavy weight, large volume and high driving voltage with increasing display area. Accordingly, flat panel display (FPD) devices, such as liquid crystal display (LCD) devices, plasma display panel (PDP) devices and organic electroluminescent display (ELD) devices, having excellent characteristics of light weight and low power consumption have been the subject of recent research.

In general, an LCD device is a non-emissive display device that displays images by controlling the transmittance of light from a backlight unit through a liquid crystal panel having a plurality of pixel regions. A cold cathode fluorescent lamp (CCFL) is widely used for a backlight unit. For example, a backlight unit includes a lamp emitting light, a lamp housing surrounding the lamp, a light guiding plate converting the light from the lamp into planar light, a reflecting plate under the light guiding plate upwardly reflecting downward and sideward light, a first diffusing sheet diffusing the light from the light guiding plate, first and second prism sheets adjusting a direction of light from the first diffusing sheet, and a second diffusing sheet diffusing the light from the first and second prism sheet.

With the demand for small, thin and light-weighted backlight units, a light emitting diode (LED) has been suggested for a backlight unit. In addition, an LCD device using an LED may be driven by a field sequential color (FSC) driving method for a high display quality. In a FSC driving method, a light source including red, green and blue sub-light sources are used instead of a color filter layer having red, green and blue sub-color filters. The red, green and blue light sources are sequentially turned on/off and an image of full color is displayed using an effect of persistence of vision. Accordingly, one frame for displaying an image may be divided into three sub-frames for red, green and blue colors. Each of the red, green and blue light sources is turned on during some time period of the respective sub-frame. For example, each light source is turned off during a time period for writing a data and arranging liquid crystal molecules, and each light source is turned on during the other time period of each sub-frame.

FIG. 1 is a schematic view showing a field sequential color (FSC) driving method for a liquid crystal display device according to the related art. FIG. 1 shows a single frame for a FSC driving method. In FIG. 1, one frame of about 16.7 ms is divided into red (R), green (G) and blue (B) sub-frames of about 5.56 ms. Each sub-frame is divided into a first time period "AP" for writing data, a second time period "WP" for arranging liquid crystal molecules, and a third time period "FP" for emitting light by a light source including red, green and blue sub-light sources. The first, second and third time periods "AP," "WP" and "FP" may be about 1.69 ms, about 1.5 ms and about 2.37 ms, respectively. Accordingly, each sub-light source is turned on during the third time period "FP" except the first and second time periods "AP" and "WP." Since the sub-light sources do not simultaneously emit light and the light source does not emit light during an entire frame, each sub-light source is driven to emit light having an increased intensity and a reduced response time of the liquid crystal molecules is required.

A light emitting diode (LED) may be used for each sub-light source of a FSC mode LCD device. In a FSC driving method, the data includes red, green and blue sub-data and each sub-data is generated for one vertical sync time period, i.e., one frame. The red, green and blue sub-data are sequentially supplied with an equal rate during one vertical sync time period. Similarly, the red, green and blue sub-light sources are sequentially turned on. Since red and green colors are further required than blue color to obtain a white colored image, the light source is driven for compensation such that output intensities of the red and green sub-light sources are higher than the output intensity of the blue sub-light source.

The display quality of the FSC mode LCD device depends on the surrounding temperature. FIGS. 2A and 2B are photographs showing images of a FSC mode liquid crystal display device according to the related art. FIGS. 2A and 2B correspond to surrounding temperatures of about 30° C. and about −20° C., respectively. As shown in FIGS. 2A and 2B, the image at about −20° C. has a lower contrast ratio and lower color reproducibility than that at about 30° C. due to deterioration of a switching element of the LCD device.

The deterioration in display quality of a FSC mode LCD device will be illustrated hereinafter. FIGS. 3A and 3B are schematic graphs showing charging of a pixel of a FSC mode liquid crystal display device according to the related art. FIGS. 3A and 3B correspond to charging at room temperature and a lower temperature, respectively. In FIGS. 3A and 3B, the absolute value of a first pixel voltage "Vdata1" for room temperature is higher than the absolute value of a second pixel voltage "Vdata2" for a low temperature when an equal gate high voltage "Vgh" of about 25V is applied to a gate line at room temperature and a low temperature. A switching element such as a thin film transistor (TFT) is generally degraded when the surrounding temperature is lowered. When the switching element is deteriorated, the pixel is not completely charged up for a predetermined charging time. Specifically, since the time for charging a pixel up to a pixel voltage is reduced in a FSC mode LCD device, incompleteness in charging causes a severer deterioration in display quality. Accordingly, the color reproducibility and contrast ratio of a FSC mode LCD device is reduced at a low temperature.

Further, as the temperature decreases, the viscosity of the liquid crystal molecules increases and the voltage to be applied to liquid crystal molecules increases for a required transmittance. FIG. 4 is a graph showing the transmittance of a FSC mode liquid crystal display device according to the related art at room temperature (about 20° C.) and a low temperature (about −20° C.). In FIG. 4, as the temperature decreases, a voltage-transmittance (V-T) curve moves right due to the increase in viscosity of the liquid crystal molecules. Accordingly, the voltage for the black image also increases, thereby decreasing the contrast ratio and color reproducibility of a FSC mode LCD device. The decrease in contrast ratio and color reproducibility causes a reduction of display quality of a FSC mode LCD device.

SUMMARY OF THE INVENTION

A field sequential mode liquid crystal display device having an improved contrast ratio and an improved color reproducibility, and a driving method thereof is presented. The field sequential mode liquid crystal display device has an improved display quality at a relatively low temperature.

As embodied and broadly described, a temperature-compensating circuit for a liquid crystal display device includes: a temperature-sensing unit that measures at least one of a temperature of the liquid crystal display device and a surrounding ambient temperature, and outputs a gate voltage-converting signal using the measured temperature; and a DC/DC converting unit that generates a plurality of converted gate signals using the gate voltage-converting signal. Absolute values of the converted gate signals are different from each other.

In another aspect, a liquid crystal display device includes: a driving system the outputs video data; a display panel that displays an image corresponding to the video data, the display panel including a gate line, a data line crossing the gate line and a switching element connected to the gate line and the data line; a timing controller that receives the video data and outputs driving signals; a data driver that applies the video data to the data line according to the driving signals; a temperature-sensing unit that measures at least one of a temperature of the liquid crystal display device and a surrounding ambient temperature, and outputs a gate voltage-converting signal using the measured temperature; a DC/DC converting unit that generates a plurality of converted gate signals using the gate voltage-converting signal, absolute values of the converted gate signals being different from each other; and a gate driver that applies one of the plurality of converted gate signals to the gate line using the plurality of driving signals.

In another aspect, a method of driving a liquid crystal display device having a display panel and a driving circuit includes: sensing at least ones of a temperature of the liquid crystal display device and a surrounding ambient temperature to generate a gate voltage-converting signal; generating a plurality of converted gate signals using the gate voltage-converting signal, absolute values of the plurality of converted gate signals being different from each other; and applying one of the plurality of converted gate signals to the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
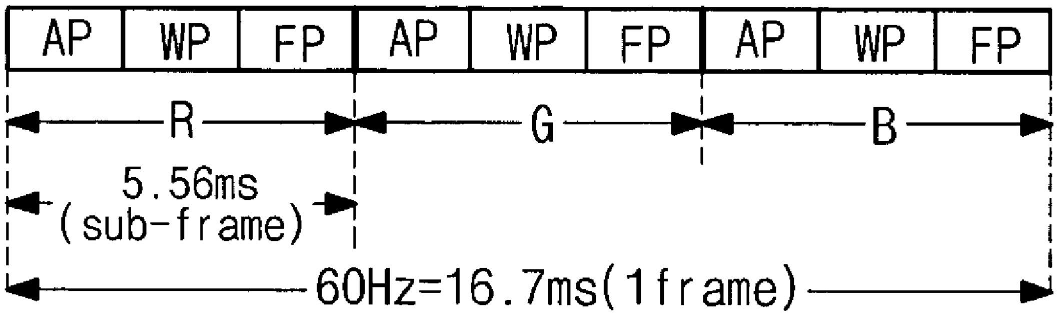
FIG. 1 Related Art
FIG. 1 is a schematic view showing a field sequential color (FSC) driving method for a liquid crystal display device according to the related art.
Figure 2A:
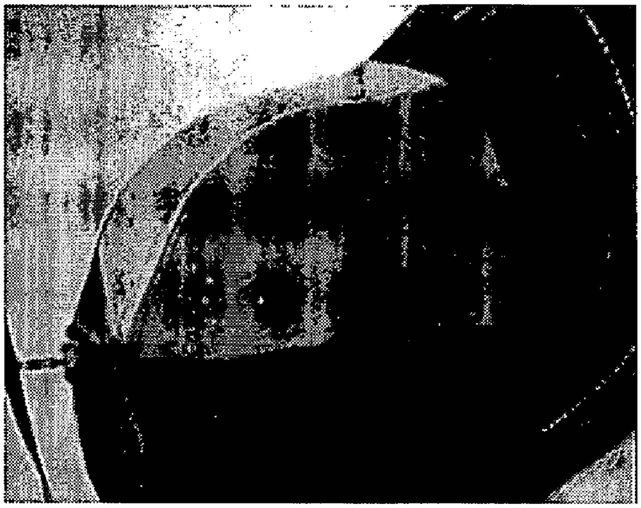
FIG. 2A Related Art
FIG. 2A is a photograph showing an image of a FSC mode liquid crystal display device according to the related art when the surrounding temperature is about 30° C.
Figure 2B:
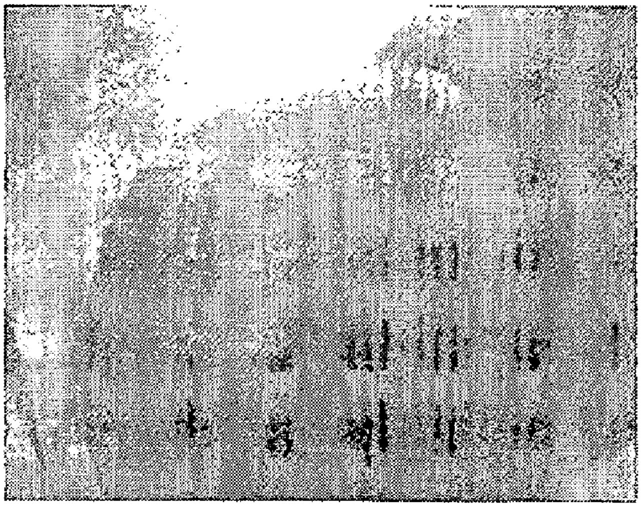
FIG. 2B Related Art
FIG. 2B is a photograph showing an image of a FSC mode liquid crystal display device according to the related art when the surrounding temperature is about −20° C.
Figure 3A:
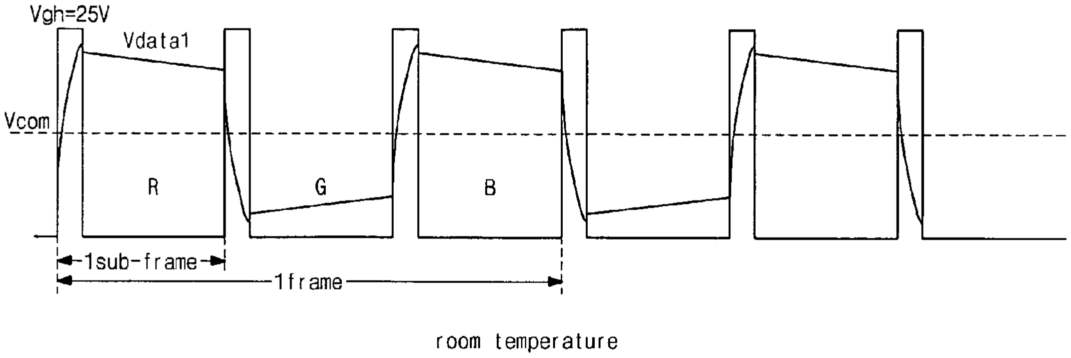
FIG. 3A Related Art
FIG. 3A is a schematic graph showing a charging property of a pixel of a FSC mode liquid crystal display device according to the related art at room temperature.
Figure 3B:
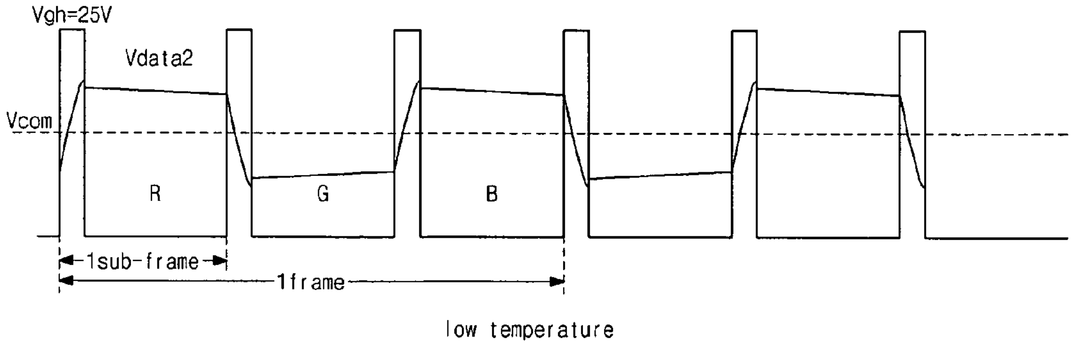
FIG. 3B Related Art
FIG. 3B is a schematic graph showing a charging property of a pixel of a FSC mode liquid crystal display device according to the related art at lower temperature.
Figure 4:
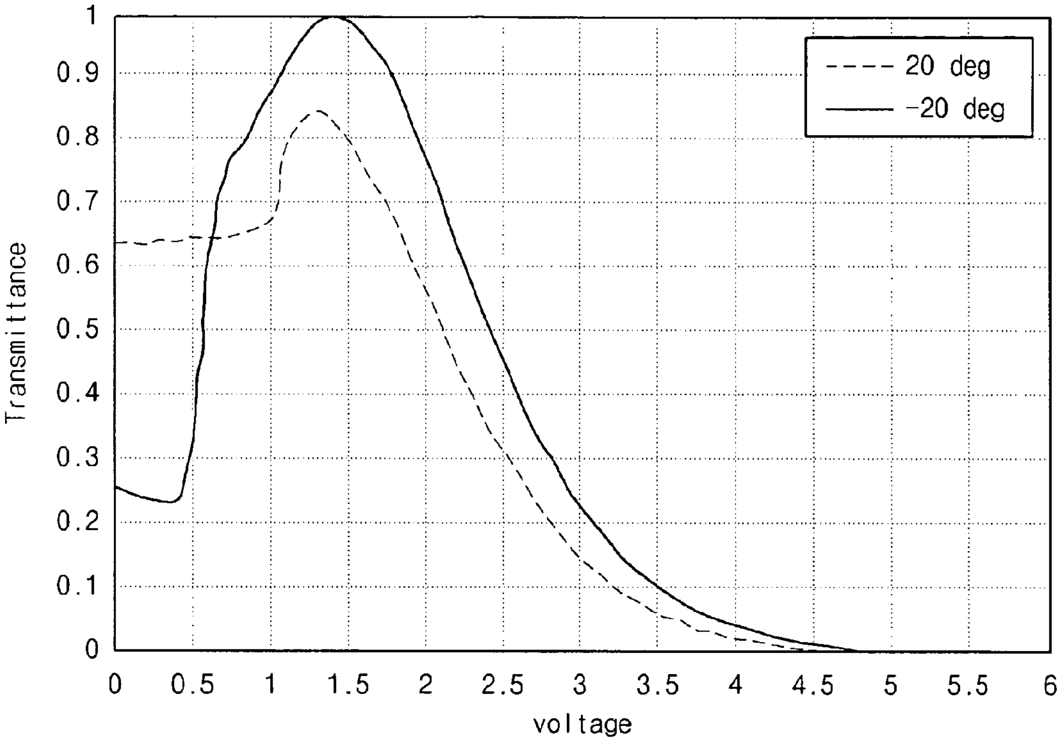
FIG. 4 Related Art
FIG. 4 is a graph showing a transmittance of a FSC mode liquid crystal display device according to the related art at room temperature of about 20° C. and a low temperature of about −20° C.
Figure 5:
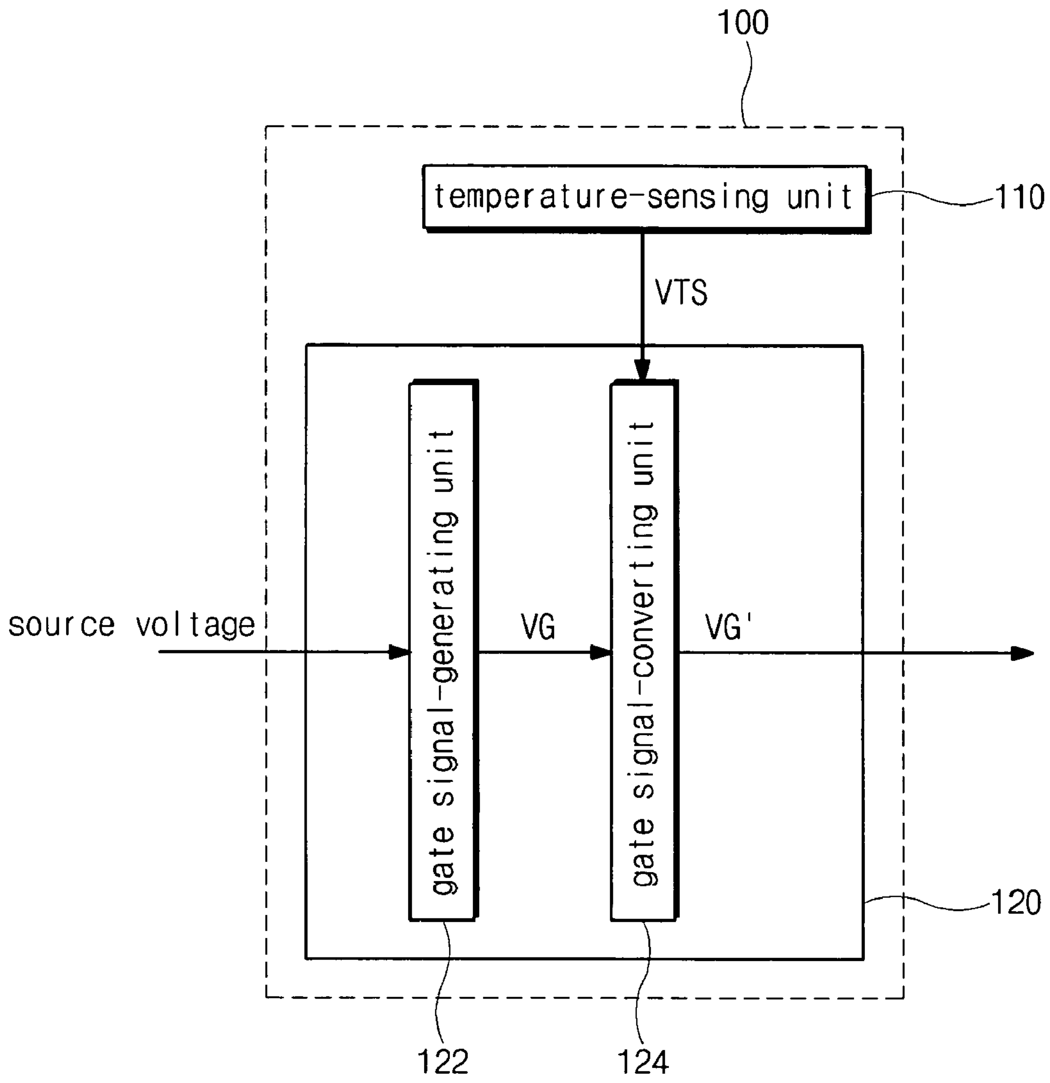
FIG. 5 is a schematic block diagram showing a temperature-compensating circuit of a field sequential color mode liquid crystal display device according to an exemplary embodiment of the present invention.

FIG. 5 is a schematic block diagram showing a temperature-compensating circuit of a field sequential color mode liquid crystal display device according to an exemplary embodiment of the present invention.

In FIG. 5, a temperature-compensating circuit 100 includes a temperature-sensing unit 110 and a direct current (DC)/direct current (DC) converting unit 120. The temperature-sensing unit 110 continuously measures the temperature of the LCD device and/or the surrounding ambient temperature. In addition, the temperature-sensing unit 110 generates a gate voltage-converting signal "VTS" by comparing the measured temperature with a reference temperature, e.g., 0° C. For example, a temperature sensor using a thin film transistor which can be simultaneously formed with switching elements on a substrate of the LCD device or a temperature sensor using a thermoelectric element may be used as a temperature-sensing unit 110.

The DC/DC converting unit 120 generates a converted gate signal using a source voltage. The DC/DC converting unit 120 may include a gate signal-generating unit 122 and a gate signal-converting unit 124. The gate signal-generating unit 122 generates a gate signal "VG" which is used at room temperature, e.g., about 30° C. For example, the gate signal "VG" may include a gate high voltage (VGH) and a gate low voltage (VGL) that turn a switching element on a substrate of the LCD device on and off, respectively, at room temperature. The gate signal-converting unit 124 generates a converted gate signal "VG" using the gate signal "VG" output from the gate signal-generating unit 122 according to the gate voltage-converting signal "VTS" output from the temperature-sensing unit 110. For example, the gate signal-converting unit 124 may output the gate signal "VG" without amplification as a first converted gate signal "VG'" at room temperature e.g., about 30° C., and may output an amplified gate signal higher than the gate signal "VG" as a second converted gate signal "VG'" at low temperature, e.g., about −20° C. As a result, the DC/DC converting unit 120 may output the gate signal "VG" as a first converted gate signal "VG'" at room temperature and may output the amplified gate signal as a second converted gate signal "VG'" at low temperature. In addition, an amplification circuit that can amplify the gate signal "VG" by about 120% may be used as the gate signal-converting unit 124.

Figure 6A:
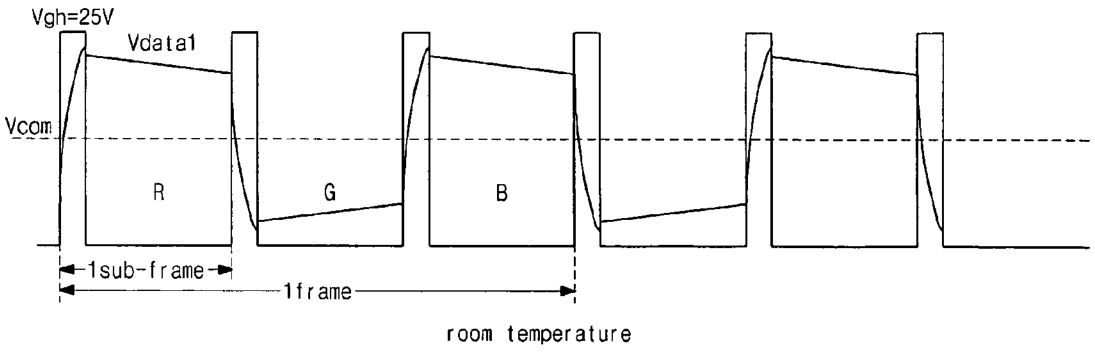
FIG. 6A is a schematic graph showing a charging property of a pixel of a field sequential color mode liquid crystal display device according to an exemplary embodiment of the present invention at room temperature.
Figure 6B:
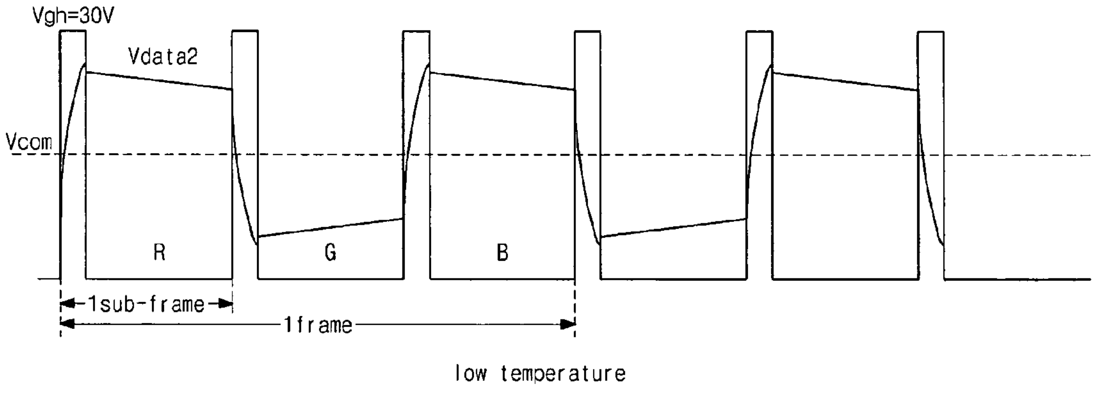
FIG. 6B is a schematic graph showing a charging property of a pixel of a field sequential color mode liquid crystal display device according to an exemplary embodiment of the present invention at a lower temperature.

FIGS. 6A and 6B are schematic graphs showing charging of a pixel of a field sequential color mode liquid crystal display device according to an exemplary embodiment of the present invention. FIGS. 6A and 6B correspond to room temperature and a lower temperature, respectively.

As shown in FIGS. 6A and 6B, a gate high voltage of about 25V is applied to a gate line of a FSC mode LCD device as a first converted gate signal "VG'" (of FIG. 5) at room temperature, and a gate high voltage of about 30V is applied to a gate line of a FSC mode LCD device as a second converted gate signal "VG'" (of FIG. 5) at low temperature. Since the second converted gate signal is higher than the first converted gate signal and is applied to a gate line at low temperature, the absolute value of a second pixel voltage "Vdata2" at low temperature is similar to the absolute value of a first pixel voltage "Vdata1" at room temperature in spite of deterioration of the switching element. Accordingly, reduction in the display quality such as color reproducibility and contrast ratio is prevented.

Figure 7:
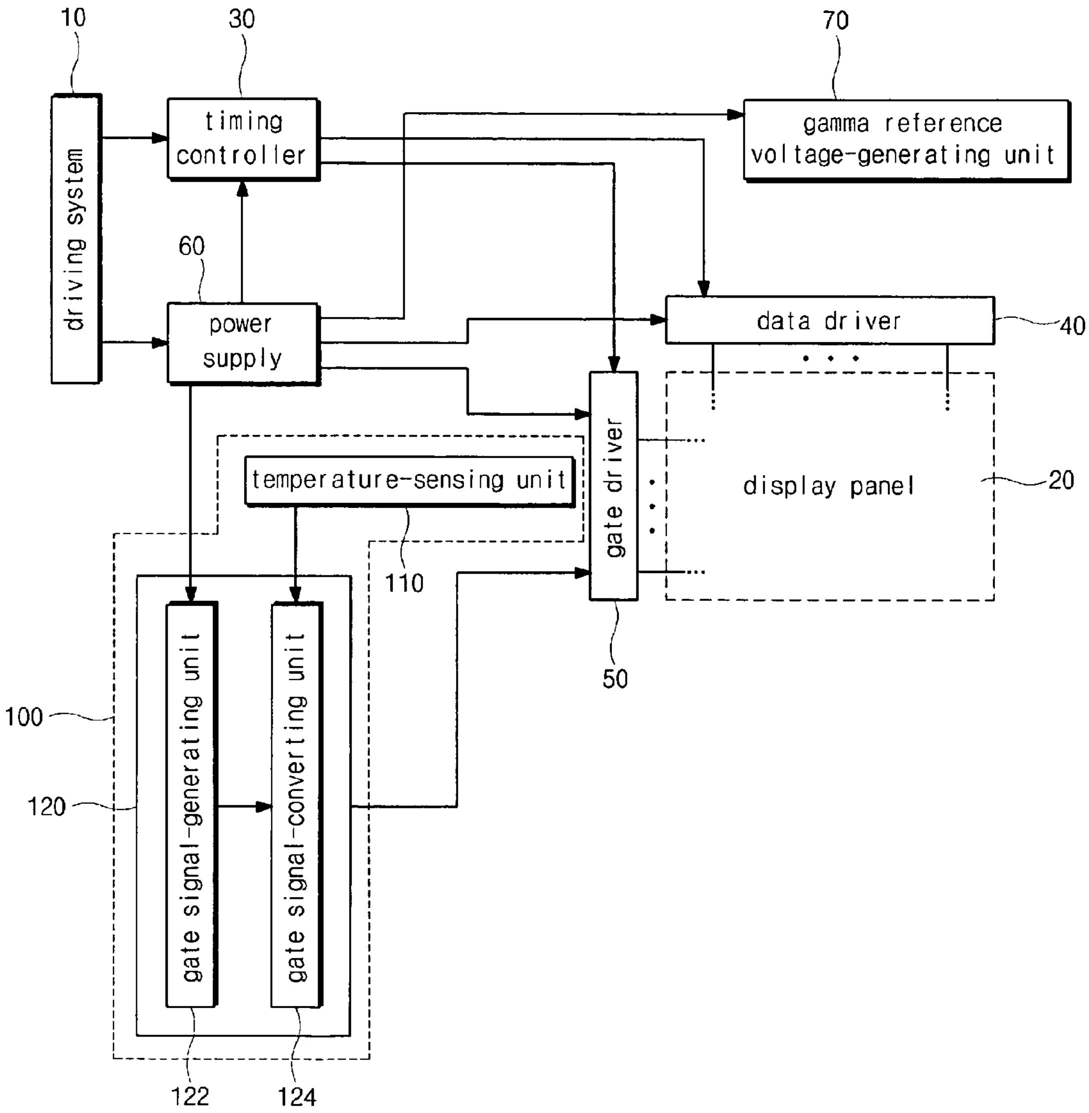
FIG. 7 is a schematic block diagram showing a field sequential color mode liquid crystal display device according to an exemplary embodiment of the present invention.

FIG. 7 is a schematic block diagram showing a field sequential color mode liquid crystal display device according to an exemplary embodiment of the present invention.

In FIG. 7, a liquid crystal display (LCD) device includes a driving system 10, a display panel 20, a gate driver 50, a data driver 40, a timing controller 30, a power supply 60, a gamma reference voltage-generating unit 70, and a temperature-compensating circuit 100. The driving system 10 serially outputs digital video data. The display panel 20 includes a plurality of gate lines and a plurality of data lines disposed in matrix. The display panel 20 further includes a switching element and a liquid crystal layer. The output video data is input to the timing controller 30, and the timing controller 30 outputs a plurality of driving signals for the gate driver 50 and the data driver 40 and a grey level signal input to the gamma reference voltage-generating unit 70. The gamma reference voltage-generating unit 70 outputs a gamma reference voltage for the video data to the data driver 40. The power supply 60 supplies a source power to every unit of the LCD device.

Figure 8:
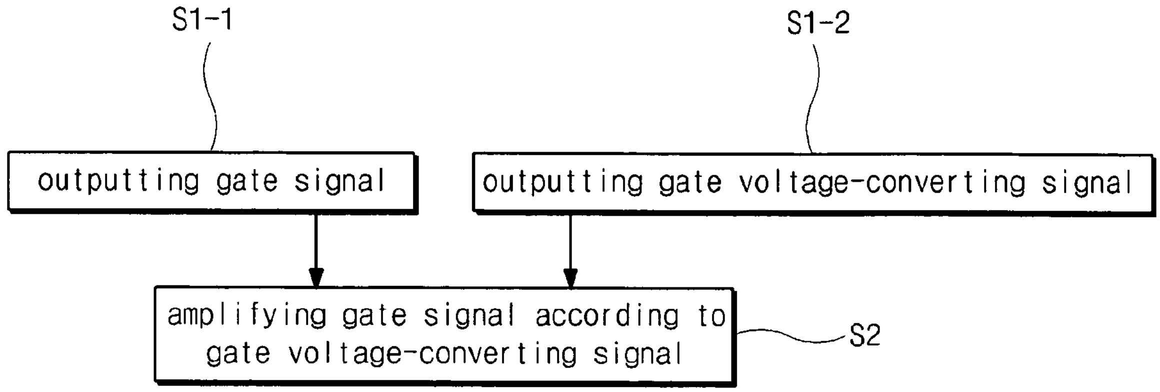
FIG. 8 is a flow chart illustrating an operation of a temperature-compensating circuit of a field sequential color mode liquid crystal display device according to an exemplary embodiment of the present invention.

FIG. 8 is a flow chart illustrating an operation of a temperature-compensating circuit of a field sequential color mode liquid crystal display device according to an exemplary embodiment of the present invention.

In FIG. 8, a driving system 10 (of FIG. 7) outputs digital video data to a timing controller 30 (of FIG. 7) and the timing controller 30 (of FIG. 7) outputs a grey level signal to a gamma reference voltage-generating unit 70 (of FIG. 7). The gamma reference voltage-generating unit 70 (of FIG. 7) generates a gamma voltage using the grey level signal and the gamma voltage is supplied to a data driver 40 (of FIG. 7). The timing controller 30 (of FIG. 7) supplies the video signal and a data control signal to the data driver 40 (of FIG. 7) and a gate control signal to a gate driver 50 (of FIG. 7). In addition, a power supply 60 (of FIG. 7) supplies power to a DC/DC converting unit 120 (of FIG. 5).

A temperature-compensating circuit 100 (of FIG. 5) including a temperature-sensing unit 110 (of FIG. 5) and the DC/DC converting unit 120 (of FIG. 5) generates a converted signal "VG'" (of FIG. 5) according to a gate voltage-converting signal "VTS" (of FIG. 5). The DC/DC converting unit 120 (of FIG. 5) includes a gate signal-generating unit 122 and a gate signal-converting unit 124 (of FIG. 5).

At step S1-1, the gate signal-generating unit 122 generates a gate signal "VG" (of FIG. 5). For example, the gate signal "VG" may include a gate high voltage (VGH) and a gate low voltage (VGL) that turn a switching element on a substrate of the LCD device on and off, respectively, at room temperature. The gate signal "VG" (of FIG. 5) may be applied to a gate line as a first converted gate signal at room temperature, e.g., about 30° C.

At step S1-2, the temperature-sensing unit 110 (of FIG. 5) continuously measures the temperature of the LCD device and/or the surrounding ambient temperature, and outputs a gate voltage-converting signal "VTS" (of FIG. 5) to the gate signal-converting unit 124 (of FIG. 5) by comparing the measured temperature with a reference temperature, e.g., 0° C. For example, the temperature-sensing unit 110 (of FIG. 5) may output the gate voltage-converting signal "VTS" (of FIG. 5) when the temperature of the LCD device is lower than the reference temperature.

At step S2, the gate signal-converting unit 124 generates a converted gate signal "VG'" (of FIG. 5) using the gate signal "VG" (of FIG. 5) according to the gate voltage-converting signal "VTS." For example, the gate signal-converting unit 124 (of FIG. 5) may not amplify the gate signal "VG" (of FIG. 5) and output the gate signal "VG" (of FIG. 5) as a first converted gate signal "VG'" (of FIG. 5) at room temperature. In addition, the gate signal-converting unit 124 may amplify the gate signal "VG" (of FIG. 5) and may output an amplified gate signal higher than the gate signal "VG" (of FIG. 5) as a second converted gate signal "VG'" (of FIG. 5) at low temperature. In addition, the gate signal-converting unit 124 may amplify the gate signal "VG" (of FIG. 5) by about 120%.

Even though the temperature-compensating circuit is applied to a FSC mode LCD device in an exemplary embodiment of the present invention, the temperature-compensating circuit may be applied to an LCD device that is driven using a conventional driving method. Further, even though the temperature of the LCD device and/or the surrounding ambient temperature is classified into two groups: room temperature and a low temperature in an exemplary embodiment of the present invention, the temperature may be divided into a plurality of groups and a plurality of converted gate signals may be used for the plurality of groups in another embodiment.

Consequently, in a field sequential color (FSC) mode liquid crystal display (LCD) device including a temperature-compensating circuit according to the present invention, color reproducibility and contrast ratio at low temperature is improved. Since the temperature-compensating circuit compensates the reduction of gate signal on the basis of temperature, power consumption is reduced and a display quality at low temperature is improved.

What is claimed is:

1. A temperature-compensating circuit for a liquid crystal display device, comprising:

a temperature-sensing unit that measures at least one of a temperature of a liquid crystal display device and a surrounding ambient temperature, and outputs a gate voltage-converting signal using the measured temperature; and a converting unit that generates a plurality of converted gate signals using the gate voltage-converting signal, absolute values of the plurality of converted gate signals being different from each other, wherein the converting unit comprises a gate signal-generating unit that generates a gate signal and a gate signal-converting unit that amplifies the gate signal according to the gate voltage-converting signal to generate the plurality of converted gate signals, and wherein one of the plurality of converted gate signals is applied to a gate line of the liquid crystal display device.

2. The circuit according to claim 1, wherein the gate voltage-converting signal is generated using a comparison between the measured temperature and a reference temperature.

3. The circuit according to claim 2, wherein the reference temperature is 0° C.

4. The circuit according to claim 1, wherein the plurality of converted gate signals include first and second converted gate signals, the first converted gate signal has the same absolute value as the gate signal and the second converted gate signal has an absolute value higher than the first converted gate signal.

5. The circuit according to claim 1, wherein an absolute value of the highest converted gate signal is about 120% of an absolute value of the lowest converted gate signal.

6. The circuit according to claim 1, wherein the temperature-sensing unit includes a temperature sensor using one of a thin film transistor and a thermoelectric element.

7. A liquid crystal display device comprising:

a driving system that outputs video data;

a display panel that displays an image corresponding to the video data, the display panel including a gate line, a data line crossing the gate line and a switching element connected to the gate line and the data line;

a timing controller that receives the video data and outputs a plurality of driving signals;

a data driver that applies the video data to the data line according to the plurality of driving signals;

a temperature-sensing unit that measures at least one of a temperature of the liquid crystal display device and a surrounding ambient temperature, and outputs a gate voltage-converting signal using the measured temperature;

a converting unit that generates a plurality of converted gate signals using the gate voltage-converting signal, absolute values of the plurality of converted gate signals being different from each other; and a gate driver that applies one of the plurality of converted gate signals to the gate line of the display panel using the plurality of driving signals, wherein the converting unit includes a gate signal-generating unit that generates a gate signal and a gate signal-converting unit that amplifies the gate signal according to the gate voltage-converting signal to generate the plurality of converted gate signals.

8. The device according to claim 7, further comprising a gamma reference voltage-generating unit that generates a gamma reference voltage supplied to the data driver.

9. The device according to claim 7, further comprising a power supply that supplies source power to the driving system, the data driver, the temperature-sensing unit, the converting unit and the gate driver.

10. The device according to claim 7, wherein the gate voltage-converting signal is generated using a comparison between the measured temperature and a reference temperature.

11. The device according to claim 10, wherein the reference temperature is 0° C.

12. The device according to claim 7, wherein the plurality of converted gate signals include first and second converted gate signals, the first converted gate signal has the same absolute value as the gate signal and the second converted gate signal has an absolute value higher than the first converted gate signal.

13. The device according to claim 7, wherein an absolute value of the highest converted gate signal is about 120% of an absolute value of the lowest converted gate signal.

14. The device according to claim 7, wherein the temperature-sensing unit includes a temperature sensor using one of a thin film transistor and a thermoelectric element.

15. The device according to claim 7, wherein absolute values of voltages applied to a pixel in the display panel at room and low temperatures are substantially equal.

16. A method of driving a liquid crystal display device having a display panel and a driving circuit, the method comprising:

sensing at least one of a temperature of the liquid crystal display device and a surrounding ambient temperature to generate a gate voltage-converting signal;

generating a gate signal and amplifying the gate signal according to the gate voltage-converting signal to generate a plurality of converted gate signals, absolute values of the plurality of converted gate signals being different from each other; and applying one of the plurality of converted gate signals to a gate line of the display panel.

17. The method according to claim 16, further comprising at least partially compensating for the effects of temperature on display of an image by the liquid crystal display device using the converted gate signals.

18. The method according to claim 16, further comprising increasing an absolute value of a voltage of the converted gate signals as the sensed temperature decreases.

19. The method according to claim 18, further comprising changing the voltage of the converted gate signals such that a substantially equal voltage is applied to pixels of the liquid crystal display panel independent of the sensed temperature.

* * * * *